United States Patent
Franzaroli

(10) Patent No.: US 9,132,961 B2
(45) Date of Patent: Sep. 15, 2015

(54) CONVEYOR WITH ADJUSTABLE LATERAL GUIDES

(75) Inventor: Massimo Franzaroli, Castel Maggiore Bologna (IT)

(73) Assignee: PULSAR S.R.L., Castel Maggiore—Bologna (IT)

( * ) Notice: Subject to any disclaimer, the term of this patent is extended or adjusted under 35 U.S.C. 154(b) by 30 days.

(21) Appl. No.: 13/977,223

(22) PCT Filed: Sep. 30, 2011

(86) PCT No.: PCT/IB2011/054310
§ 371 (c)(1),
(2), (4) Date: Dec. 18, 2013

(87) PCT Pub. No.: WO2012/090079
PCT Pub. Date: Jul. 5, 2012

(65) Prior Publication Data
US 2014/0110228 A1    Apr. 24, 2014

(30) Foreign Application Priority Data
Dec. 30, 2010    (IT) .............................. BO2010U0136

(51) Int. Cl.
*B65G 15/60*    (2006.01)
*B65G 21/20*    (2006.01)
(Continued)

(52) U.S. Cl.
CPC ................ *B65G 15/60* (2013.01); *B65G 15/44* (2013.01); *B65G 17/26* (2013.01); *B65G 19/24* (2013.01); *B65G 21/20* (2013.01);
(Continued)

(58) Field of Classification Search
CPC .... B65G 17/26; B65G 21/20; B65G 21/2045; B65G 21/2063; B65G 21/2072

USPC ................ 198/836.1, 836.3, 836.4, 837, 850, 198/861.1
See application file for complete search history.

(56) References Cited

U.S. PATENT DOCUMENTS

| 3,844,405 A | | 10/1974 | Shuford | |
|---|---|---|---|---|
| 5,515,668 A | * | 5/1996 | Hunt et al. ....................... | 53/543 |
| 6,050,396 A | * | 4/2000 | Moore ........................ | 198/836.3 |

(Continued)

FOREIGN PATENT DOCUMENTS

| EP | 1 386 861 | | 2/2004 |
|---|---|---|---|
| JP | 2003276840 A | * | 10/2003 |
| WO | 03/042075 | | 5/2003 |

OTHER PUBLICATIONS

International Search Report dated Jan. 25, 2012, corresponding to PCT/IB2011/054310.

*Primary Examiner* — Leslie A Nicholson, III
(74) *Attorney, Agent, or Firm* — Young & Thompson

(57) ABSTRACT

A conveyor for transporting products includes a mounting frame for one or more product feed lanes, each lane being defined by a respective conveyor belt which extends along a respective path, and by element for centering the products on the conveyor belt and including respective first and second lateral guides which are spaced from each other transversely to the direction of extension of the conveyor belt in order to define a track having a respective width. A unit for adjusting the distance between the guides are provided which includes a first transversal support and movement member for the corresponding lateral guide of the lane, and a second transversal support and movement member for the other lateral guide of the lane. Also provided is a respective transversal member for supporting the first and second support and movement members and a defining unit for fastening to the conveyor frame.

20 Claims, 15 Drawing Sheets

(51) Int. Cl.
*B65G 17/26* (2006.01)
*B65G 15/44* (2006.01)
*B65G 19/24* (2006.01)

(52) U.S. Cl.
CPC ....... *B65G 21/2045* (2013.01); *B65G 21/2063* (2013.01); *B65G 21/2072* (2013.01)

(56) References Cited

U.S. PATENT DOCUMENTS

| | | | |
|---|---|---|---|
| 6,378,695 | B1 | 4/2002 | Rinne |
| 7,721,876 | B2 * | 5/2010 | Hartness et al. ............ 198/836.3 |
| 8,668,073 | B2 * | 3/2014 | Petrovic et al. ................ 198/452 |
| 2008/0099311 | A1 | 5/2008 | Hartness et al. |

\* cited by examiner

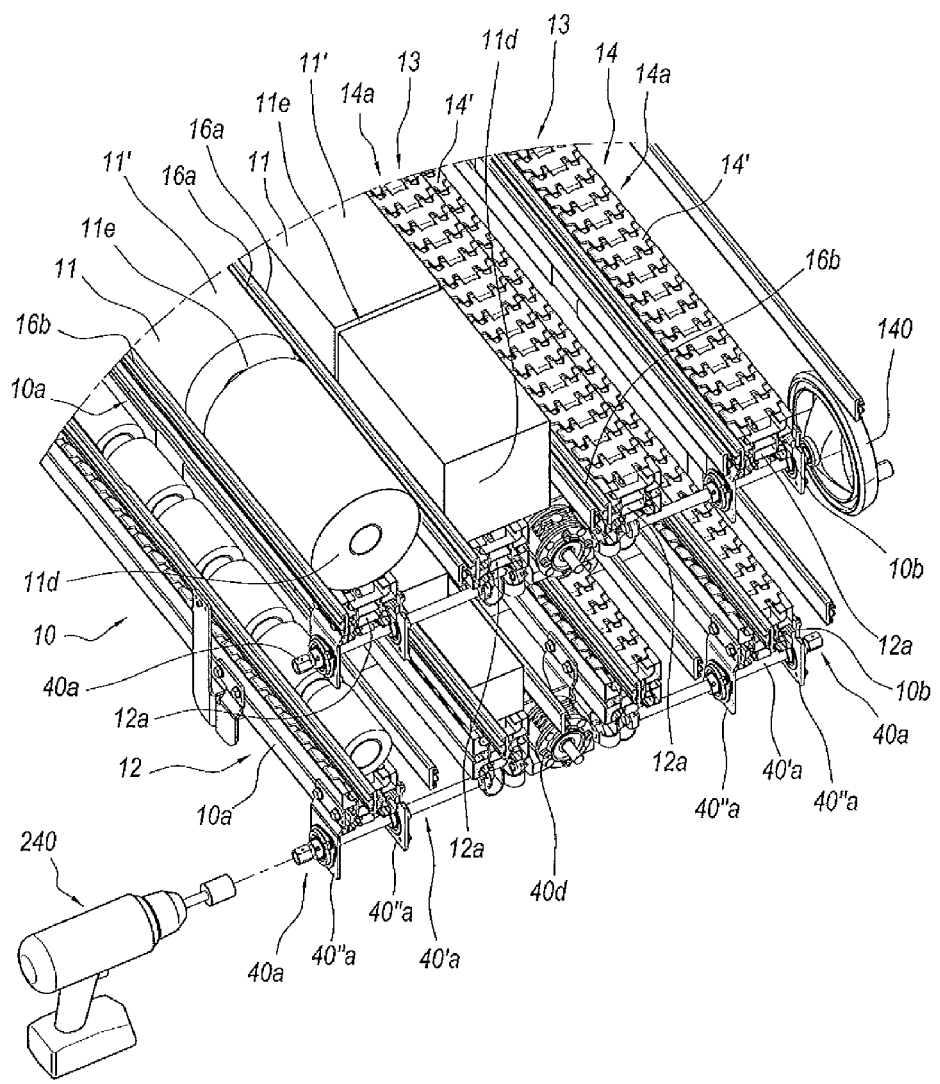

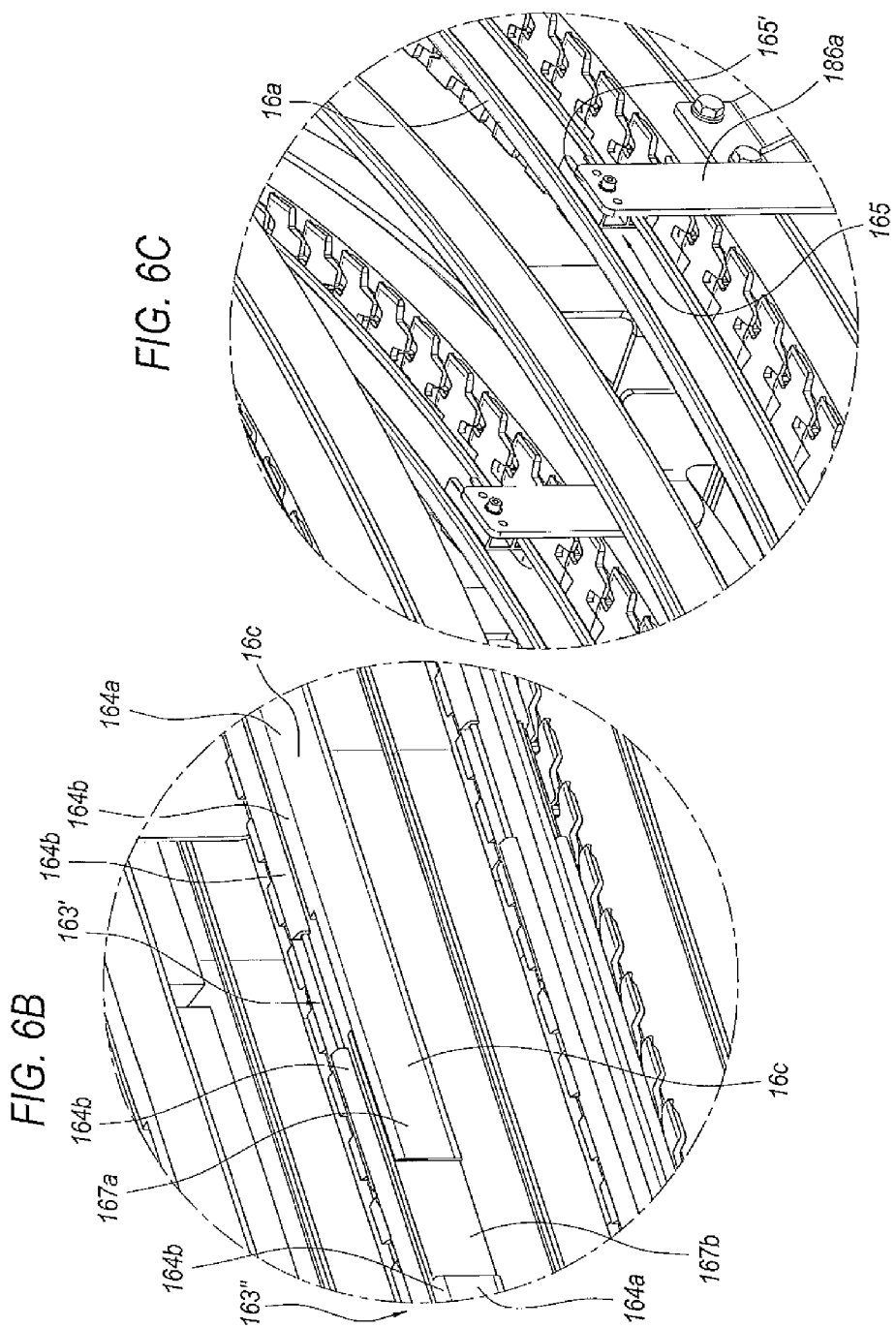

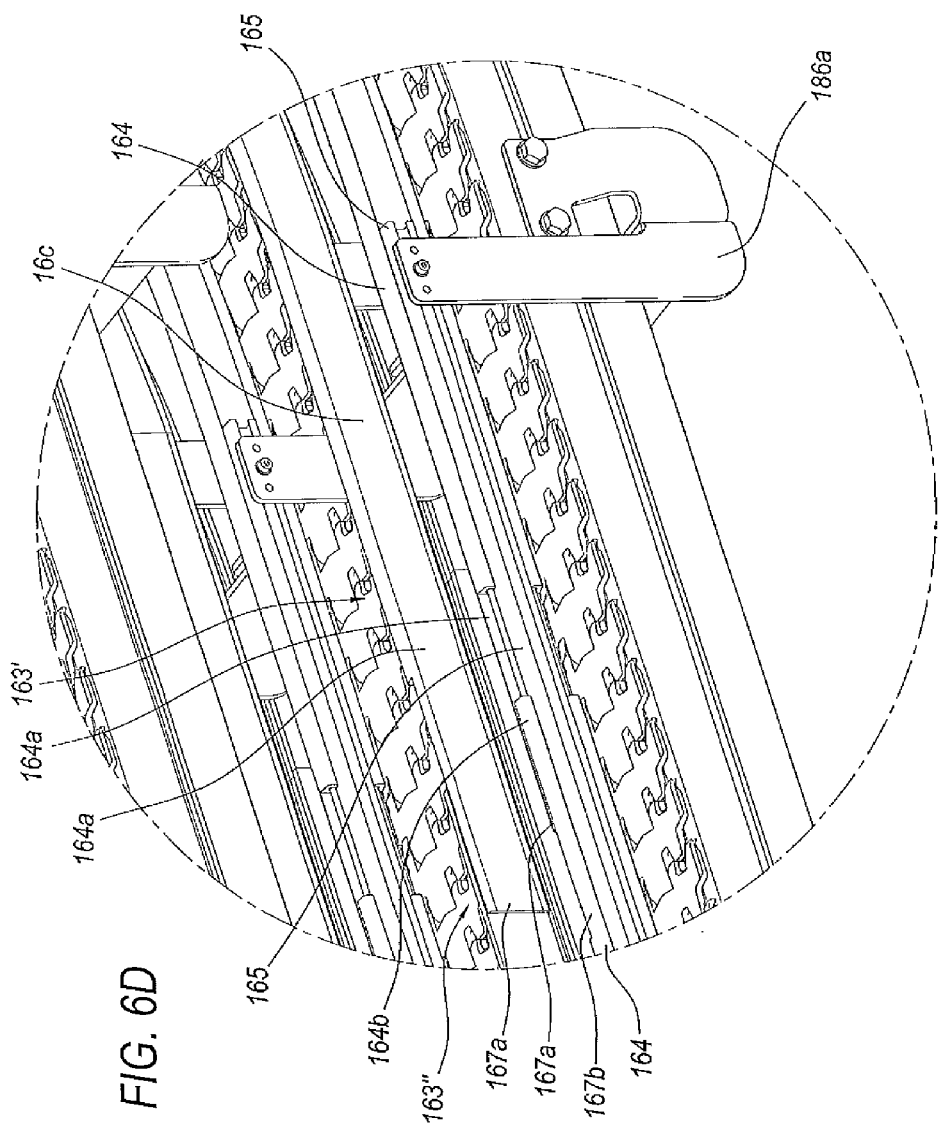

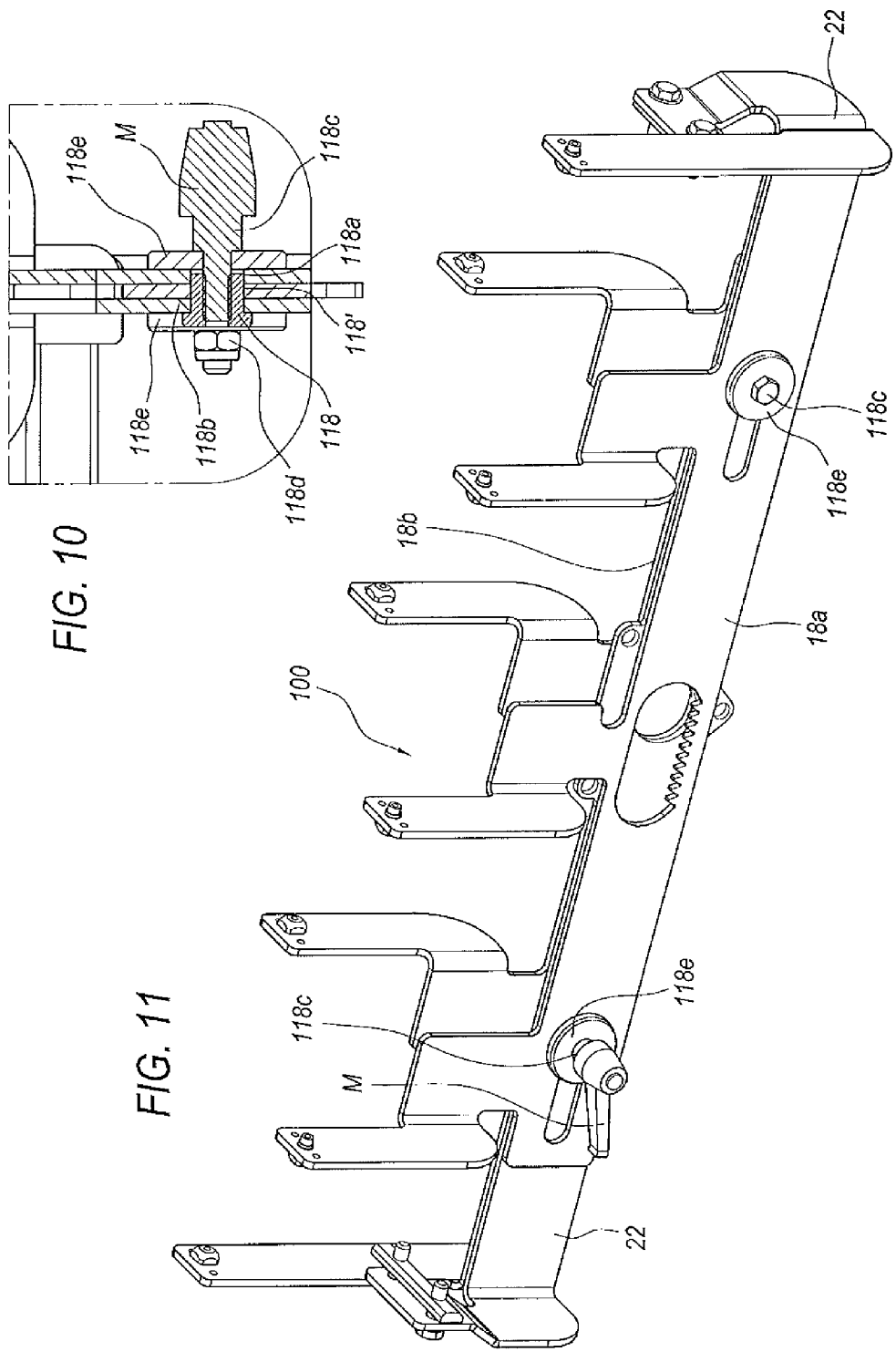

CONVEYOR WITH ADJUSTABLE LATERAL GUIDES

TECHNICAL FIELD

This invention relates to a conveyor for transporting products.

BACKGROUND ART

Known in the prior art are conveyors for transporting products which comprise a mounting frame for one or more product feed lanes. Each lane is defined by a respective conveyor belt, preferably of the type with articulated links, which extends along a respective path, and by means for centering the products on the conveyor belt and comprising respective first and second lateral guides which are spaced from each other transversely to the direction of extension of the conveyor belt in order to define a track having a respective width.

In prior art conveyors, means are provided for adjusting the transversal spacing of the first and second lateral guides and which extend above the product conveyor surface, encumbering the space above the conveyor and creating a hindrance for personnel having to work on the products being conveyed. Alternatively, the adjustment means may also be located underneath the conveyor surface but in this case, too, the conveyor becomes cumbersome in height, creating difficulties especially if there two or more different conveyor surfaces on different levels, one above the other.

Moreover, operators in the field feel the need for a conveyor having means for adjusting the lateral guides which are quick and easy to set up, even on conveyors or conveying structures which have already been installed.

Another need felt by operators in the trade is that for a conveyor having guide adjustment means which can be operated in different ways, either manual or power-driven, according to specific installation requirements.

Yet another need felt by operators in the trade is that for a conveyor having guide adjustment means which can be operated quickly and easily, allowing savings in terms of labour required for the adjustment operations.

A further need felt by operators in the field is that for a conveyor having guide adjustment means which allow track size to be varied in a wide range, even if the conveyor includes curved stretches with a large curvature radius.

A further need felt by operators in the trade is that for a conveyor having guide adjustment means and/or guides which can be adapted to products having widely varying transversal dimensions or diameter and, in particular, where the dimensions of one are twice that of another.

A yet further need felt by operators in the trade is that for a conveyor having adjustment means which are inexpensive to make and/or which are quick and easy to set up.

SUMMARY OF THE INVENTION

This invention therefore proposes a new solution as an alternative to the solutions known up to now and, more specifically, proposes to overcome one or more of the above mentioned drawbacks and/or problems and/or to meet one or more of the needs mentioned in, or inferable from, the above.

It is accordingly provided a conveyor for transporting products, the products being preferably in the form of rolls or packs of material for household or personal use, in particular, rolls of paper, for example toilet paper or kitchen paper, packs of facial or pocket tissues, paper napkins or the like, the conveyor comprising a mounting frame for one or more product feed lanes, each lane being defined by a respective conveyor belt, preferably of the type with articulated links, which extends along a respective path, and by means for centering the products on the conveyor belt and comprising respective first and second lateral guides which are spaced from each other transversely to the direction of extension of the conveyor belt in order to define a track having a respective width; the first and second lateral guides extending along the direction of extension of the belt or lane and having a respective surface for laterally engaging the product; means being provided for adjusting the width of the track; the conveyor being characterized in that the adjustment means comprise a first transversal support and movement member for the corresponding lateral guide of the lane, and a second transversal support and movement member for the other lateral guide of the lane, and also characterized in that a respective transversal member is provided for supporting the first and second support and movement members and defining means for fastening to the conveyor frame.

That way, the lateral guides can be provided with adjustment means whose construction cost is limited and which are quick and easy to set up and which, in particular, can be applied to conveyor structures already installed.

According to another aspect, it is also provided a conveyor for transporting products, the products being preferably in the form of rolls or packs of material for household or personal use, in particular, rolls of paper, for example toilet paper or kitchen paper, packs of facial or pocket tissues, paper napkins or the like, the conveyor comprising a mounting frame for one or more product feed lanes, each lane being defined by a respective conveyor belt, preferably of the type with articulated links, which extends along a respective path, and by means for centering the products on the conveyor belt and comprising respective first and second lateral guides which are spaced from each other transversely to the direction of extension of the conveyor belt in order to define a track having a respective width; the first and second lateral guides extending along the direction of extension of the belt or lane and having a respective surface for laterally engaging the product; means being provided for adjusting the width of the track; the conveyor being characterized in that each lateral guide comprises a respective elongate member which extends longitudinally in a curved stretch of the lane or conveyor and a respective elongate member which extends longitudinally in a straight or linear stretch of the lane or conveyor, the elongate members having respective adjacent ends which can be moved relative to each other longitudinally, or along the direction of extension of the lane or conveyor, and which have respective mutual coupling portions in such a way as to define a lateral guide which is continuous or substantially continuous along the direction of extension of the lane or conveyor.

That way, track size can be changed even if the conveyor includes curved stretches with a large curvature radius.

BRIEF DESCRIPTION OF THE DRAWINGS

This and other innovative aspects are set out in the appended claims and the technical features and advantages are apparent from the detailed description which follows of non-limiting example embodiments with reference to the accompanying drawings, in which:

FIG. 1A is a perspective view of a preferred embodiment of a conveyor according to this invention;

FIGS. 6B to 6D show respective details from FIG. 1B, illustrating the lateral guide members in particular;

FIG. 10 is a cross section through line X-X of FIG. 9;

FIG. 11 is a perspective view of only the guide adjustment means in the second preferred embodiment of the conveyor;

DESCRIPTION OF THE PREFERRED
EMBODIMENTS OF THE INVENTION

FIGS. 1A to 7 illustrate a first preferred embodiment 10 of a conveyor for transporting products 11.

Figure 1B:
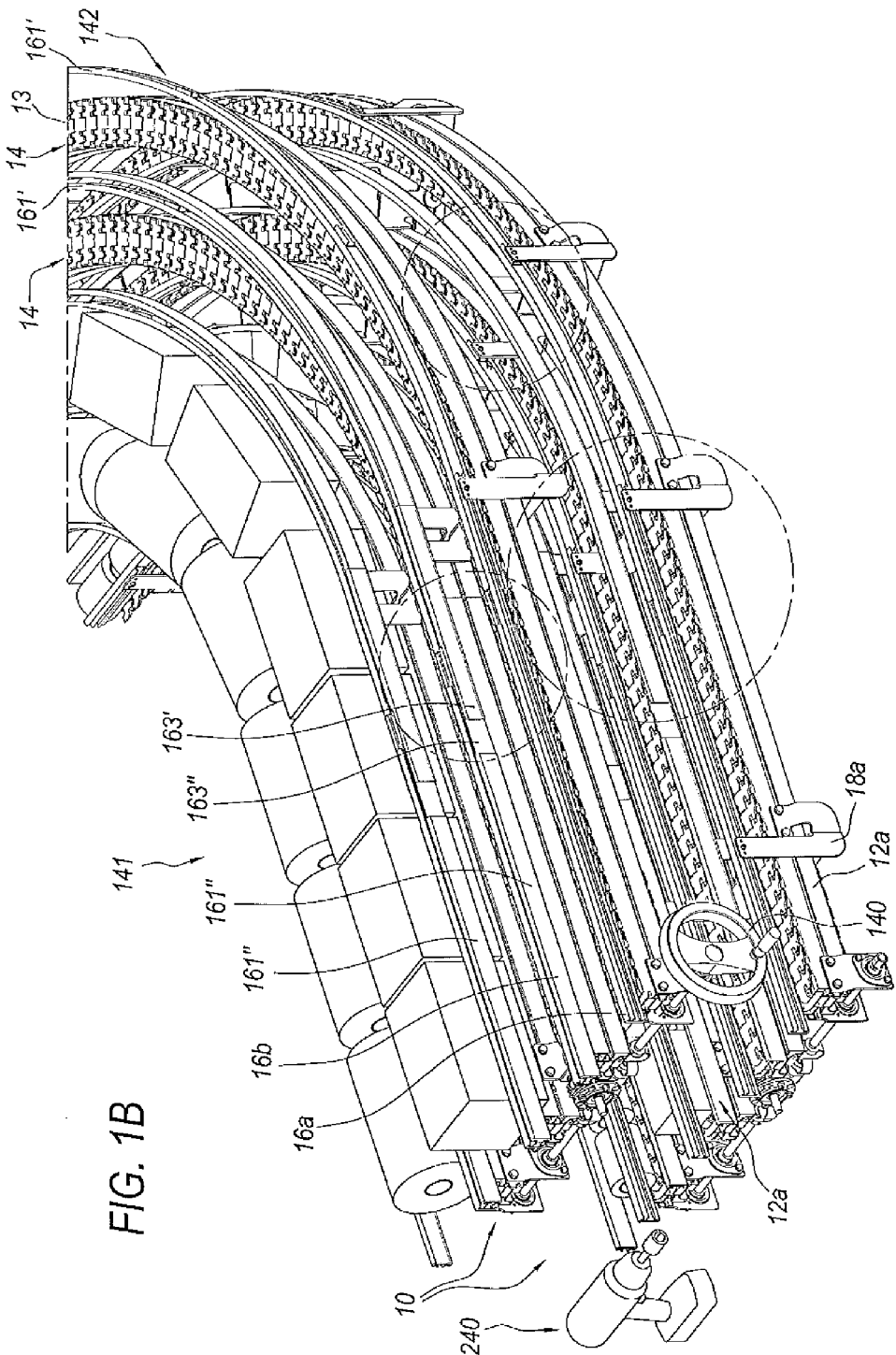
FIG. 1B shows the preferred embodiment of the conveyor according to the invention, in a perspective view from a different angle from that of FIG. 1A.

As may be inferred from FIGS. 1A and 3A, the products are preferably in the form of products whose peripheral surface 11' has a bottom supporting surface 11a, opposite lateral faces 11b, 11c and opposite transversal ends 11d, 11e. The reference 11f, on the other hand, denotes a top face of the article or product being conveyed.

The products transported by the conveyor of the invention are normally aligned with each other on a respective transporting path along which the conveyor extends.

The products are tissue products and, more specifically, are in the form of rolls or packs of material for household or personal use, in particular, rolls of paper, for example toilet paper or kitchen paper, packs of facial or pocket tissues, paper napkins or the like.

The conveyor 10 comprises a mounting frame 12 for one or more lanes 13, in particular, as illustrated, for a plurality of lanes 13 which, preferably, extend in parallel with each other and which feed the products from a receiving end of the lanes, not illustrated in detail in the accompanying drawings, to a product transfer or delivery end, also not illustrated in the accompanying drawings.

As illustrated, each lane 13 is defined by a respective conveyor belt 14, preferably of the type with articulated links 14', essentially known in the trade and therefore not described again in detail, that is to say, links like those described in Italian patent application No. BO2010A000415 in the name of the same applicant.

As illustrated, the conveyor belt has an upper, positive feed stretch 14a and a lower, return stretch 14b.

Also, at its far ends, not illustrated in the drawings, the conveyor belt 14 is driven by wheels which mesh with the conveyor links 14'.

The conveyor is, as illustrated, defined by lanes 13, each of which has straight stretches and curved stretches, and more specifically, at least one straight stretch 141 or at least one curved stretch 142.

As illustrated, the mounting frame 12 comprises, for each lane 13, a respective elongate profile 12a, extending longitudinally, or along the conveyor feed path, the profile 12a being supported by respective uprights, not illustrated in detail in the accompanying drawings, and slidably mounts a respective conveyor belt 14.

More specifically, as illustrated, the cross section of the profile 12a is such as to define sliding and retaining guides for the upper stretch 14a and for the lower stretch 14b of the conveyor belt 14, the upper and lower stretches extend, or move, while remaining at the upper face and at the lower face of the corresponding profile 12a.

More specifically, for each lane 13, there is a plurality of straight and curved profiles 12a aligned with each other in such a way as to define, in their entirety, the feed path of the articulated link conveyor belt 14.

As mentioned, the lane 13 is defined by a conveyor belt 14, which extends along a respective path, and also by means for centering the products on the conveyor belt 14, the centering means comprising respective first and second lateral guides 16a, 16b which are spaced from each other transversely to the direction of extension of the conveyor belt, or lane, or conveyor, in order to define a track having a respective width "d".

Advantageously, adjustment means 18 are provided for adjusting the track width "d" or transverse distance between the first and second lateral guides 16a, 16b.

Advantageously, the track adjustment means comprise a first transversal support and movement member 18a for the corresponding lateral guide 16a of the lane, and a second transversal support and movement member 18b for the other lateral guide 16b of the lane.

Advantageously, a transversal member 22 supports the first and second support and movement members 18a, 18b defining means for fastening to the conveyor 10 frame 12.

As illustrated, the first and second guides 16a, 16b of each track extend along the direction of belt extension or lane 13 and have respective lateral surfaces, in particular vertical surfaces 16c, for laterally engaging the product 11, that is to say, for engaging the lateral faces 11b, 11c of each product.

As illustrated in FIG. 1A, the conveyor might have a plurality of conveying levels, placed over each other, and each having respective lanes 13.

Each conveyor or conveying level also has corresponding flanks 10a, 10b, which are, in particular, defined by the longitudinal profiles 12a of the side lanes of the conveyor.

More specifically, this embodiment has side lanes 13, 13 and interposed middle lanes 13, 13, that is to say, a total of four lanes for each conveying level.

Advantageously, each support and movement member 18a, 18b for the respective lateral guide 16a, 16b and/or the transversal supporting and fastening member 22 extends under the respective profile 12a supporting the conveyor belt 14, and more specifically, under both the upper and lower stretches 14a, 14b of the conveyor belt.

Further, as illustrated, each transversal support and movement member 18a, 18b for the respective lateral guide 16a, 16b and/or the transversal supporting and fastening member 22 extends substantially across the full width or transversal extension of the conveyor 10.

More specifically, each transversal support and movement member 18a, 18b for the respective lateral guide 16a, 16b and/or the transversal supporting and fastening member 22 extends transversely between the flanks 10a, 10b of the conveyor.

As illustrated, the conveyor has, between its opposite flanks 10a, 10b, a plurality of parallel conveyor belts 14 which define a respective conveying lane 13 for respective products 11.

As illustrated, the first and second transversal support and movement members 18a, 18b for the lateral guides 16a, 16b are aligned with each other along the direction of extension of the conveyor 10 and/or of the conveyor belt 14 and/or of the longitudinal supporting profile 12a.

Further, each transversal support and movement member 18a, 18b—and in particular both the transversal support and movement members 18a, 18b—for the lateral guides 16a, 16b is aligned with the fastening member 22 along the longitudinal direction, or along the direction of extension of the conveyor 10 and/or of the conveyor belt 14 and/or of the longitudinal profile 12a.

Advantageously, the transversal supporting and fastening member 22 is interposed between the first and second transversal support and movement members 18a, 18b for corresponding lateral guides 16a, 16b.

Also, advantageously, each of the transversal support and movement members 18a, 18b for a corresponding lateral guide 16a, 16b engages and runs on the transversal supporting and fastening member 22.

Each transversal support and movement member 18a, 18b for the corresponding lateral guide 16a, 16b is in the form of a suitably shaped, elongate plate.

More specifically, each transversal support and movement member 18a, 18b for the respective lateral guide 16a, 16b is in the form of a suitably shaped, elongate plate lying in a plane transversal and at right angles to the direction of extension of the conveyor, that is to say, lying in a vertical plane.

The transversal supporting and fastening member 22, too, is in turn in the form of a respective, suitably shaped, elongate plate.

More specifically, the transversal supporting and fastening member 22 is in the form of a suitably shaped, elongate plate lying in a plane transversal and at right angles to the direction of extension of the conveyor, that is to say, lying in a respective vertical plane.

Each transversal support and movement member 18a, 18b for the respective lateral guide 16a, 16b has a transversal surface or face 18'a, 18'b, respectively front and rear, which is adapted to engage and run on an opposite transversal face 22'a, 22'b of the supporting and fastening member 22.

More specifically, each transversal member 18a, 18b has a corresponding transversal surface 18'a, 18'b which is adapted to engage and run on opposite, transversal surfaces 22'a, 22'b, respectively front and rear, of the transversal supporting and fastening member 22.

Each transversal support and movement member 18a, 18b for the respective transversal guide 16a, 16b and/or the transversal supporting and fastening member 22 extends parallel to the plane in which the conveyor 10 lies, that is to say, it extends preferably in a horizontal plane.

Also, advantageously, extending perpendicularly from each transversal support and movement member 18a, 18b for the lateral guides, there is a respective short rod 186a, 186b which has a top end for fastening a corresponding lateral guide 16a, 16b.

More specifically, extending perpendicularly from each transversal support and movement member 18a, 18b for the lateral guides, there is a plurality of short rods 186a, 186b whose top ends are used for fastening respective lateral guides 16a, 16b.

That way, it is possible to define lane track adjustment means operating on a plurality of parallel lanes.

More specifically, the rods 186a, 186b for fastening the respective lateral guides 16a, 16b are substantially transversely equispaced from each other.

Advantageously, in use, each perpendicular rod for fastening a corresponding lateral guide 16a, 16b extends upwards.

More specifically, each perpendicular rod 186a, 186b extends next to the respective conveyor belt 14 upwards to a height above the supporting surface 14a on which the products are conveyed.

More specifically, the perpendicular rods 186a, 186b of the first and second transversal support and movement members are located between adjacent conveyor belts 14, 14 defining corresponding lanes 13, 13.

As illustrated, the perpendicular rods of the first and second transversal members 18a, 18b extend next to the respective profile 12a upwards and to a height above the latter.

Also, advantageously, the perpendicular rods 186a, 186b are made as one with the respective transversal member 18a, 18b.

More specifically, the perpendicular rods 186a, 186b are in the form of a strip which is bent at right angles to the elongate plate 181a, 181b defining the respective transversal member 18a, 18b.

There is also a respective segment 187a, 187b protruding perpendicularly from, and in the same plane as, the respective elongate plate 181a, 181b defining a respective transversal member, and from each segment 187a, 187b there extends laterally and upwards a perpendicular strip 186a, 186b for fastening the respective lateral guide 16a, 16b.

Each perpendicular strip 186a, 186b for fastening the respective lateral guide 16a, 16b is bent along a respective bend line perpendicularly to the respective segment 187a, 187b. The bend line is denoted by the reference numeral 187' in the accompanying drawings.

Advantageously, extending perpendicularly from the transversal fastening member 22 there are short rods 22a, 22b, each having a top end for fastening to the mounting frame 12, and more specifically, for fastening to the flanks 10a, 10b of the conveyor 10, that is to say, for fastening corresponding longitudinal profiles 12a, 12a to the flanks.

The perpendicular fastening rods 22a, 22b are made as one with the respective transversal fastening member 22.

The perpendicular fastening rods 22a, 22b are in the form of a strip bent at right angles to the elongate plate 122 defining a respective transversal fastening member 22. More specifically, each rod 22a, 22b is located at a respective lateral end of each transversal fastening member 122 and is bent along a respective perpendicular or vertical bend line 22'.

The perpendicular fastening rods 22a, 22b terminate with a wide receiving end portion 22'a, 22'b for connecting means (screws) by which they are fastened to the conveyor structure and which are located at the end of a respective portion 23a, 23b, the latter being slightly inclined towards the centre of the conveyor.

Advantageously, actuating means 20 are provided which are adapted to drive the first and second transversal support and movement members 18a, 18b in opposite transversal directions in such a way as to move the lateral lane guides 16a, 16b towards and away from each other, thereby adjusting or modifying the lane track, as may be inferred from FIG. 3A.

The actuating means 20 comprise a toothed wheel or pinion 20a whose respective axis of rotation is directed along the direction of extension of the conveyor.

The actuating means 20 also comprise respective racks 208a, 208b which mesh with the pinion 20a and which are preferably provided on the first and second transversal support and movement members 18a, 18b for the lateral guides.

As illustrated, each rack 208a, 208b is advantageously formed on a transversal stretch of an oblong lip of the respective transversal support and movement member 18a, 18b, defining a respective hole 208'a, 208'b into which the pinion 20a is inserted or housed.

As illustrated, the pinion 20a is also housed in a corresponding hole 220a, specifically a circular hole, made in the transversal supporting and fastening member 22.

As illustrated, each housing hole 208'a, 208'b, 220a for the pinion 20a is located in a central zone of the respective transversal member 18a, 18b, 22.

As illustrated, the racks 208a, 208b are provided on edges or lips which are perpendicularly opposite the respective holes 208'a, 208'b of the corresponding transversal support and movement members 18a, 18b.

Advantageously, the actuating means, or pinion, 20a, are mounted on the transversal supporting and fastening member 22.

For the purpose, means are advantageously provided for rotatably mounting the actuating pinion 20a on the transversal fastening member 22.

The means for rotatably mounting the pinion 20a comprise opposite perpendicular locking gusset plates 20b, 20b each having a respective hole 20'b, 20'b for insertion of a rotary shaft 20c protruding longitudinally from both sides of the mounting block.

More specifically, the rotary shaft 20c might have a circular cross section, as illustrated in this preferred embodiment, or a polygonal cross section, or preferably, a square cross section.

The means for rotatably mounting the actuating pinion 20a are adapted to engage a perpendicularly extended central portion of the transversal fastening member, the perpendicularly extended portion being denoted by the reference 22c and protruding beyond the upper and lower edges of the transversal support and movement members 18a, 18b.

Holes 222c for fastening the locking gusset plates 20b, 20b are provided at the upwardly protruding portions 22'c and downwardly protruding portions 22'c.

As illustrated, the locking gusset plates 20b, 20b comprise respective holes 20d for insertion of locking screws 20e which are also inserted into the holes 222c of the transversal supporting and fastening member 22. The reference 20f denotes threaded bushes for fastening the screws 20e.

The actuating pinion 20a is integral with the rotary shaft 20c of the actuating block, on which it is coaxially mounted and secured thanks to a hollow tube 20'a protruding longitudinally from the meshing pinion proper 20a and having a respective hole 20"a for the passage of a corresponding screw 20'c for fastening the rotary shaft 20c coaxially inserted in it.

Also advantageously provided are supporting and sliding means by which each transversal support and movement member 18a, 18b for the lateral guide elements moves transversely relative to the transversal supporting and fastening member 22.

The supporting and sliding means comprise a respective transversely oblong slot 118a, 118b, and more specifically, a first and a second transversely oblong slot 118a, 118a and 118b, 118b, made in the respective transversal support and movement member 18a, 18b.

The first and second transversely oblong slots 118a, 118a and 118b, 118b, are positioned symmetrically about the centre line of the respective support and movement member 18a, 18b, at a respective lateral end of the support and movement member 18a, 18b.

More specifically, a first transversely oblong slot 118a, 118b is located at the respective lateral end of each support and movement member 18a, 18b, while, opposite it, the second transversely oblong slot 118a, 118b is located at a certain distance from the opposite end of the respective support and movement member 18a, 18b.

The supporting and sliding means also comprise a longitudinal pin 118 which is inserted into each of the transversely oblong slots 118a, 118b, made in each support and movement member 18a, 18b and which slidably engages a respective elongate stretch or edge of the oblong lip defining the respective slot 118a, 118b.

The pin 118 is also inserted into a corresponding circular retaining hole 118' made in the transversal movement and fastening member 22.

The pin 118 is in the form of a hollow cylindrical body for insertion of the stem of a corresponding bolt 118c with a large head and a threaded stem 118" acting in conjunction with a lock nut 118d, for tightening corresponding perforated discs 118e, 118e against the respective and opposite transversal support and movement surface 18a, 18b.

In practice, the pin 118 is in the form of a hollow cylindrical body for insertion of the stem 118" of a corresponding means for tightening corresponding perforated discs 118e, 118e, against the respective opposite front and rear surface of the respective transversal support and movement member 18a, 18b.

In practice, tightening means 118e are provided which also allow the transversal members 18a, 18b to slide freely on the supporting member 22.

Advantageously, in a second preferred embodiment 100 of the conveyor which is described with reference to FIGS. 8 to 11, where the components that are similar to those of the embodiment described above are denoted by the same reference numerals and are not described again in detail to avoid making this description too lengthy, the tightening means 118c is integral with a hand control "M" for locking/unlocking the transversal movement of the respective transversal member 18a, 18b relative to the transversal supporting and fastening member 22.

That means this adjustment system can be used in a totally manual way, with a simplified structure of limited cost, that is to say, by eliminating the actuating means 20 used to drive the adjustment means.

In effect, all that needs to be done is to "unscrew" the hand control "M", manually move the transversal guide holder members 18a, 18b transversely and then re-tighten the hand control "M" to lock the transversal guide holder members 18a, 18b in the desired new position.

As illustrated, in both the preferred embodiments, the adjustment means comprise a plurality of adjustment units distributed along the direction of extension of the conveyor, and are located underneath the conveyor itself and/or underneath the level defined by the product conveyor belts and/or the longitudinal profiles supporting the selfsame belts.

Returning now to the first preferred embodiment 10, centralized control means are also provided which comprise a respective control element 40*a*, in particular in the form of a rotary element, and advantageous means for transmitting the rotational movement from the control element 40*a* to the adjustment actuating means, that is to say, the respective adjustment unit 18.

The means for transmitting the drive movement to the actuating means 20 of the adjustment means 18 comprise at least one respective elongate member 40*b* extending along the direction of extension of the conveyor.

More specifically, the means for transmitting the drive movement to the actuating means of the track adjustment means comprise a plurality of shafts 40*b* connected to the rotary shafts 20*c* of the actuating means 20, that is, connected to the respective rotary shaft 20*c* of the corresponding actuating means or unit 20.

The means for transmitting the rotational movement to the actuating means of the track adjustment means comprise a plurality of shafts 40*b*, each connected to the respective rotary shaft 20*c* of the corresponding actuating means 20 through a respective cardan joint 42.

The transmission means also comprise a corresponding transversal shaft at a control head, the transversal shaft being labelled 40'*a* and being operatively connected to the longitudinal transmission means or to the corresponding longitudinal shaft 40*b*, in particular through a corresponding gearbox 40*d*.

More specifically, a first and a second transversal shaft 40'*a* are provided which are driven by a corresponding rotary element 40*a* provided at the opposite flanks of the conveyor.

In practice, each control element 40*a* of the adjustment actuating means is located at a corresponding flank of the conveyor so it can be easily accessed by the operator.

As illustrated, the transversal transmission shafts 40' *a*, 40'*b* extend from opposite sides of the shared gearbox 40*d*, positioned centrally under the conveyor.

More specifically, the transmission means comprise a transversal shaft, or more specifically, a first and a second transversal shaft 40'*a*, 40'*a*, each located at a respective flank of the conveyor.

In practice, a first and a second rotary element 40*a*, 40*a* are provided on opposite flanks of the conveyor.

That way, the adjustment means can be actuated from a central point, either by an operator working on one side of the conveyor or by an operator working on the opposite side of the conveyor.

In practice, the transmission means provided comprise a transversal shaft 40'*a* which is operatively connected to the longitudinal transmission means 40*b*.

As may be inferred from FIG. 1A, the rotatable control means 40*a* are integral with a respective crank 140 for turning them or they may define meshing means for a rotary power tool 240, such as, for example, the spindle of an electric screwdriver.

The transmission means for the rotary control means are located underneath the conveyor and/or underneath the corresponding conveyor belt and/or underneath the respective profile which supports the conveyor belt, extending along the direction of extension of the conveyor.

As illustrated, the transversal transmission shafts 40'*a* are supported by corresponding brackets 40"*a*, located at respective flanks of corresponding longitudinal supporting profiles.

As illustrated, therefore, the central control head, too, is located underneath the conveyor belt or conveyor or longitudinal profile which supports the conveyor belt.

Advantageously, each transversal member 18*a*, 18*b*, 22 is made from a respective elongate and suitably shaped piece of metal sheeting suitably bent to form corresponding perpendicular supporting and fastening portions or rods 186*a*, 186*b* and 22*b*.

Figure 2:
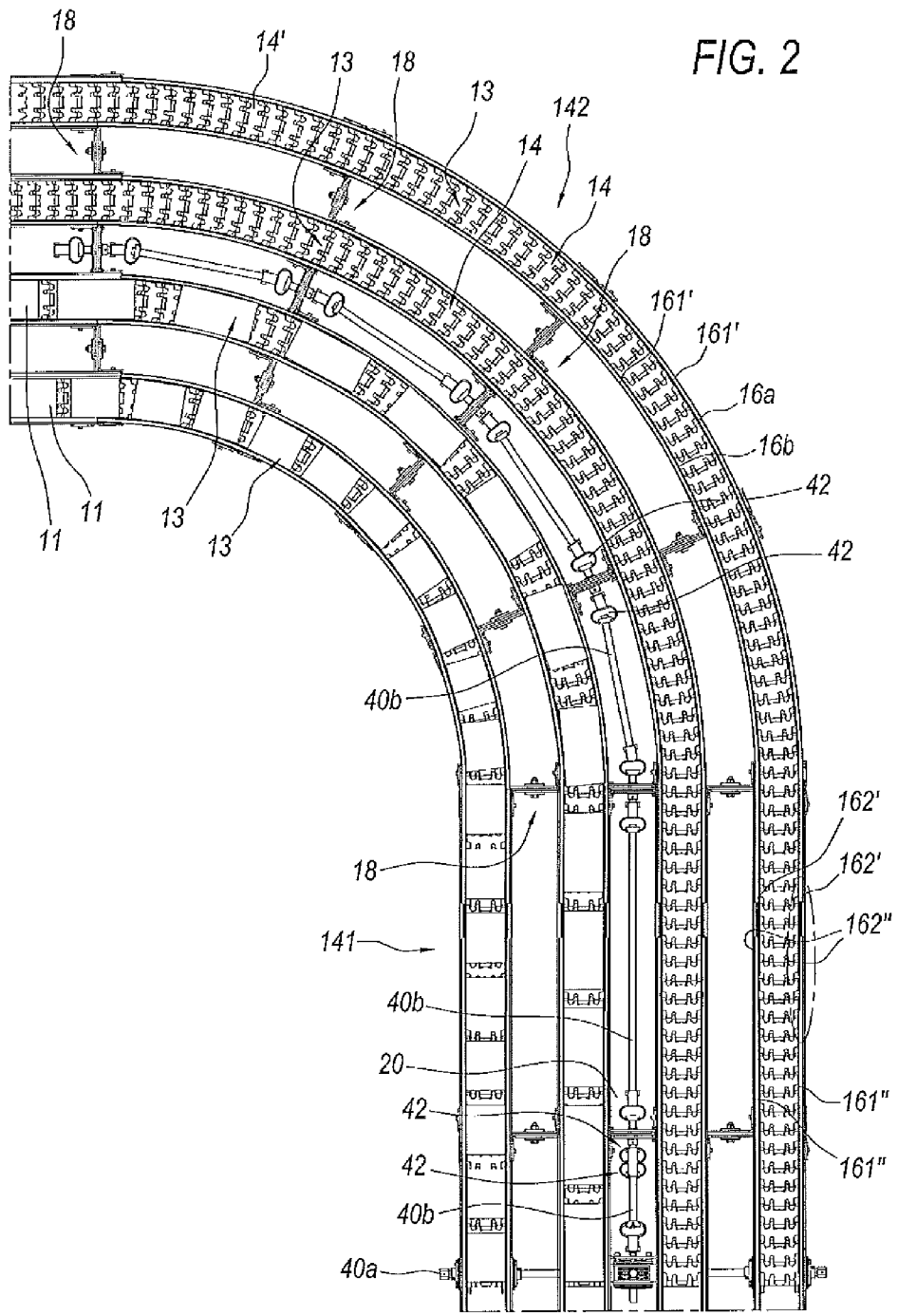
FIG. 2 is a top plan view of a part of the preferred embodiment of the conveyor belt according to the invention.
Figure 3:
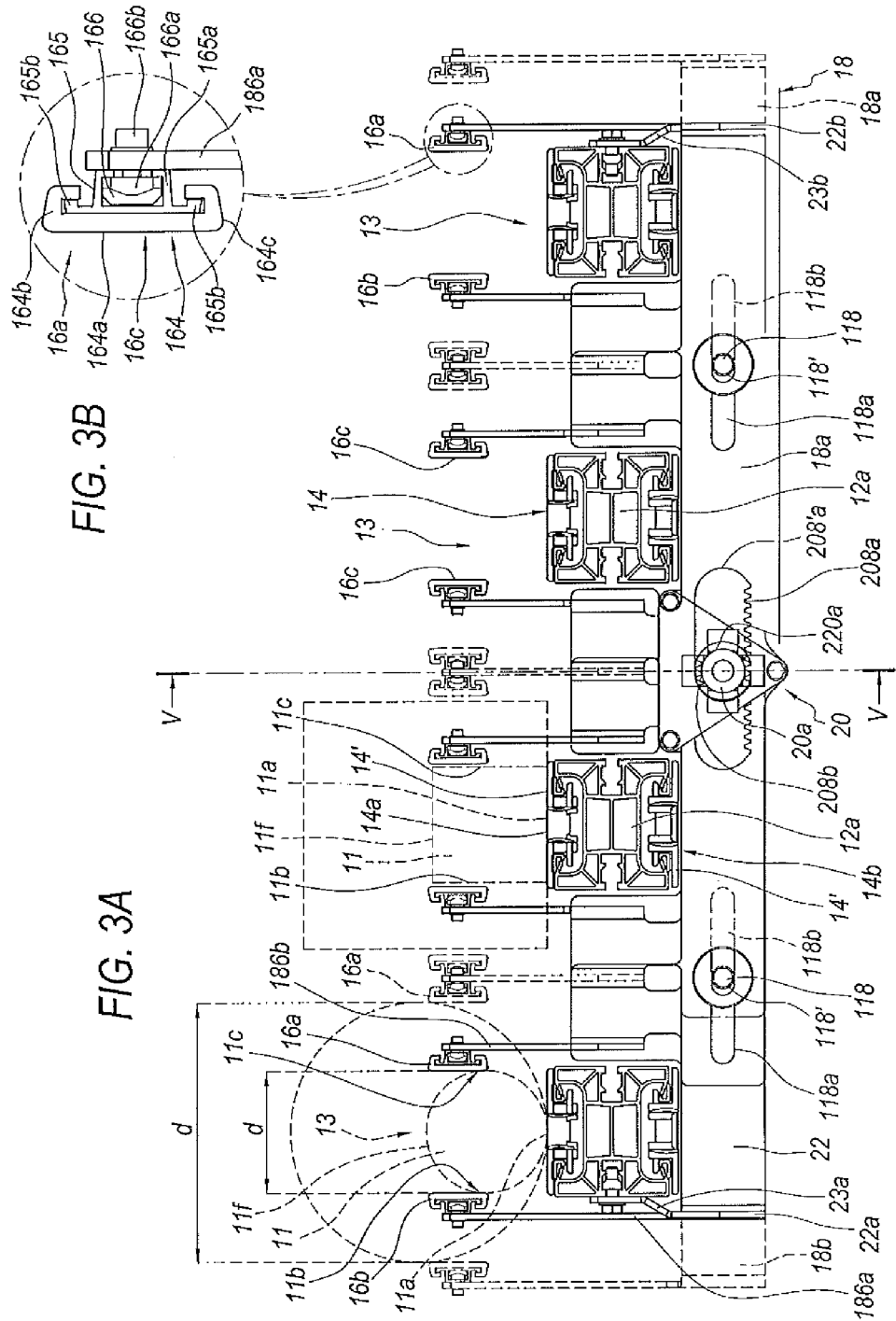
FIG. 3A is a transversal cross section of the preferred embodiment of the conveyor according to the invention, showing a straight stretch of the conveyor.
FIG. 3B is a transversal cross section of a detail from FIG. 3A, showing the lateral guide used in the preferred embodiment of the conveyor according to the invention.
Figure 4:
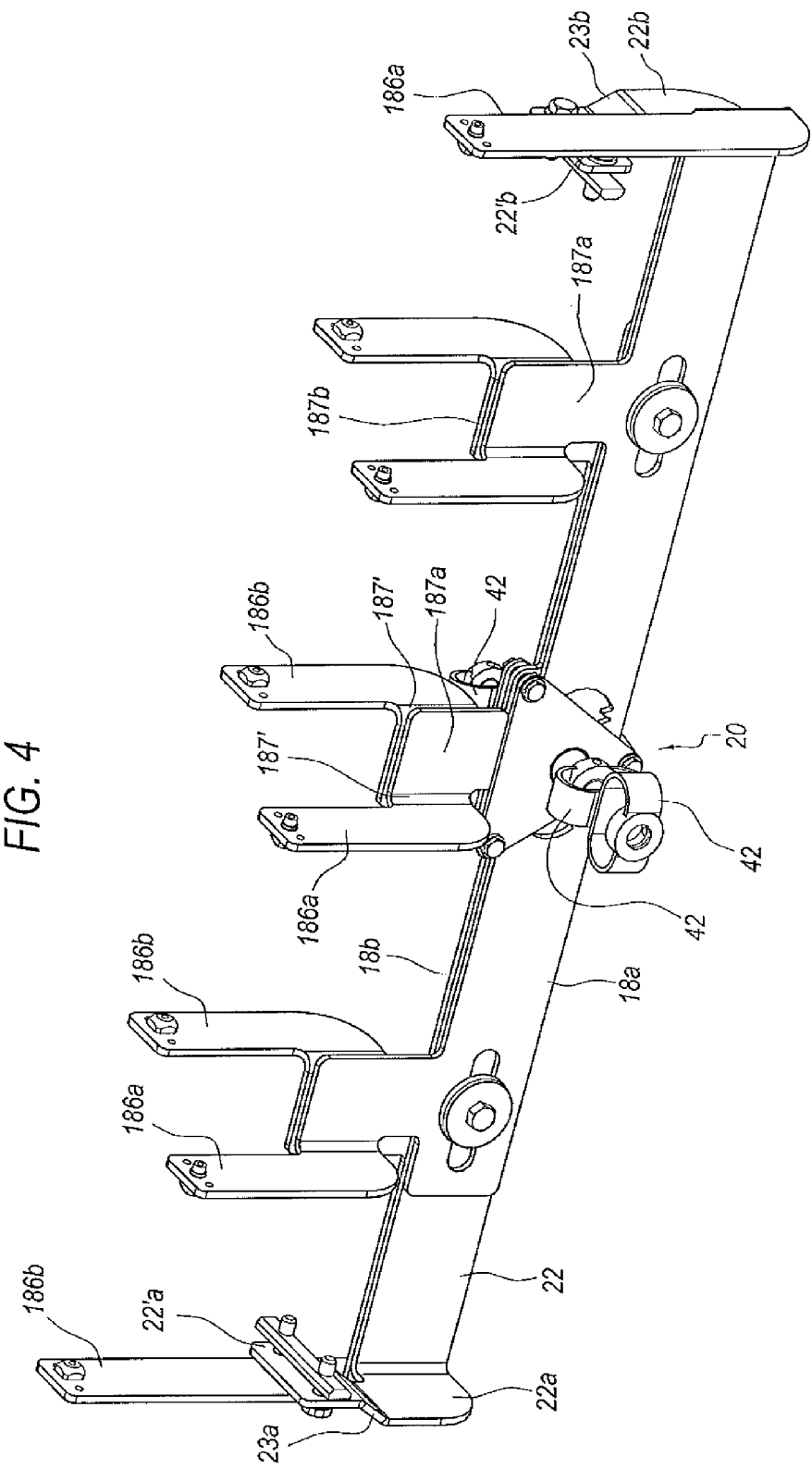
FIG. 4 shows in a perspective view only the guide adjustment means of the conveyor according to the invention.
Figure 6A:
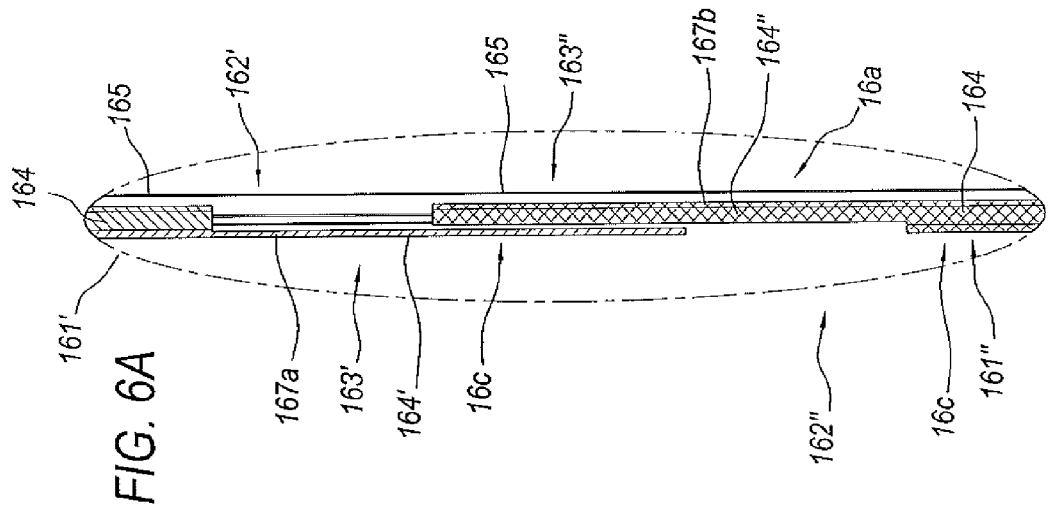
FIG. 6A is a top plan view of a detail from FIG. 2 showing the zone where the ends of the elongate members defining a lateral guide overlap.
Figure 5:
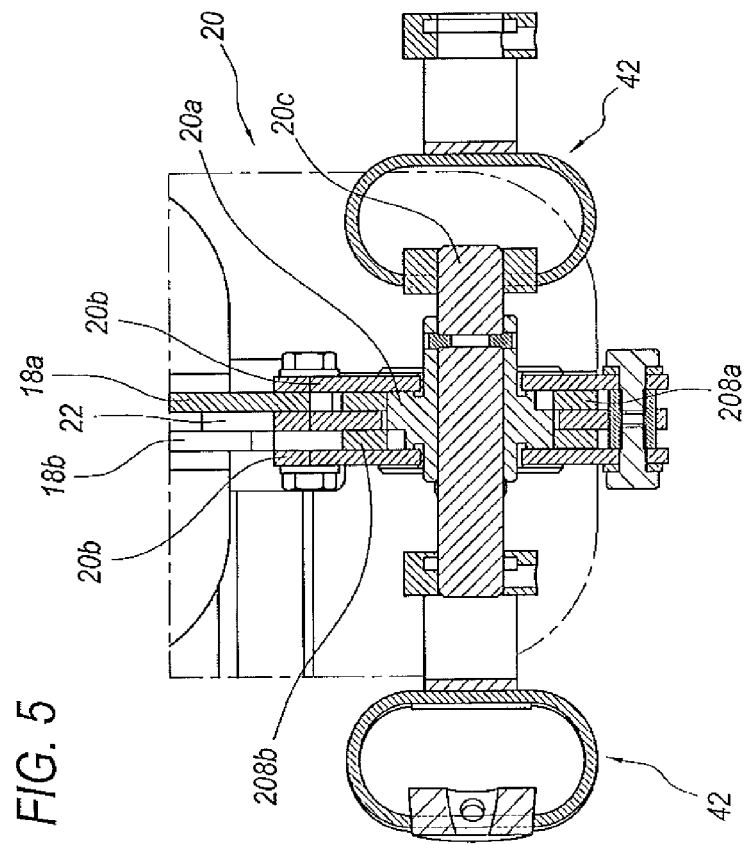
FIG. 5 is a cross section through line V-V of FIG. 3A.
Figure 7:
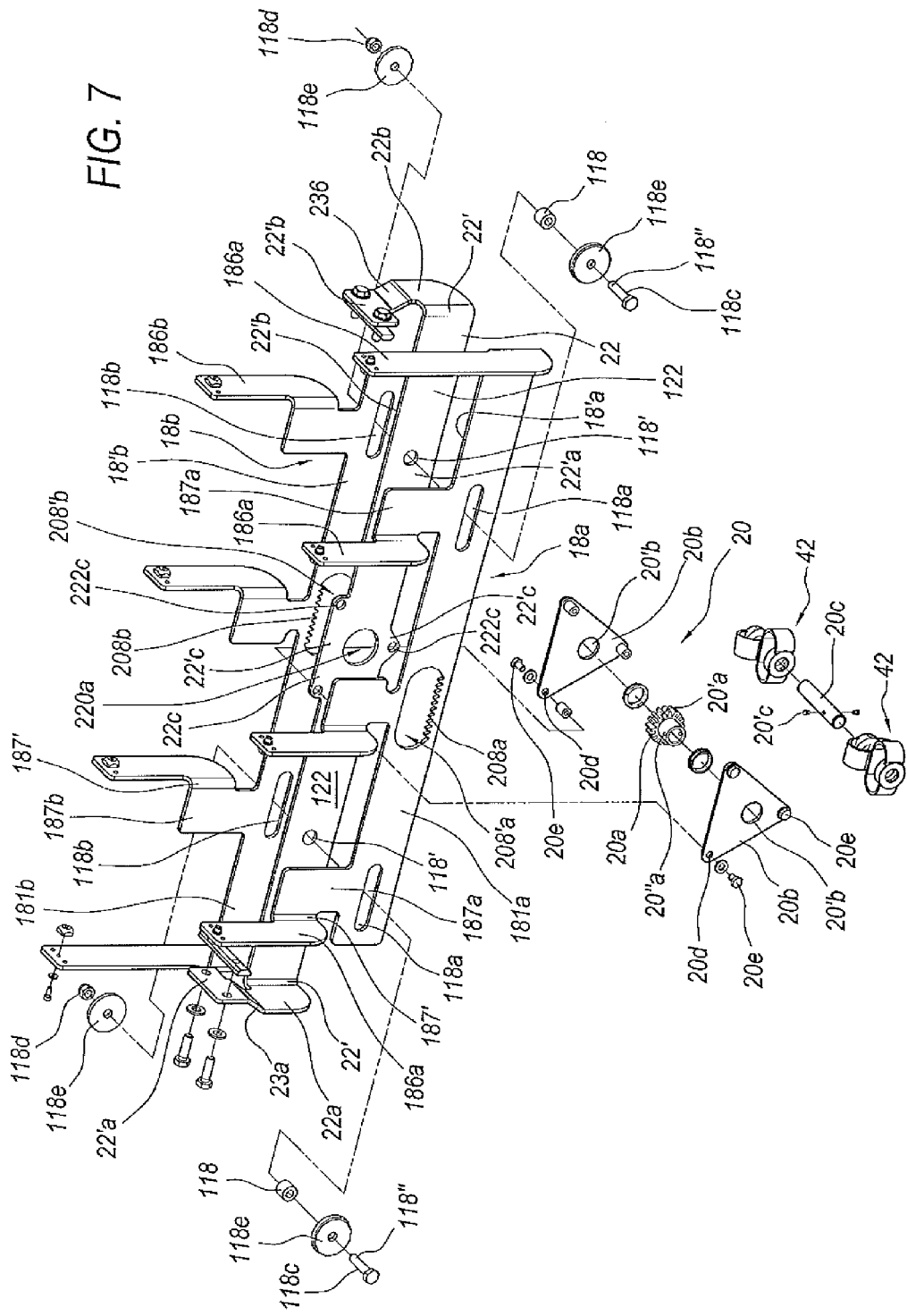
FIG. 7 is a perspective exploded view of the adjustment means in the preferred embodiment of the conveyor according to the invention.
Figure 8:
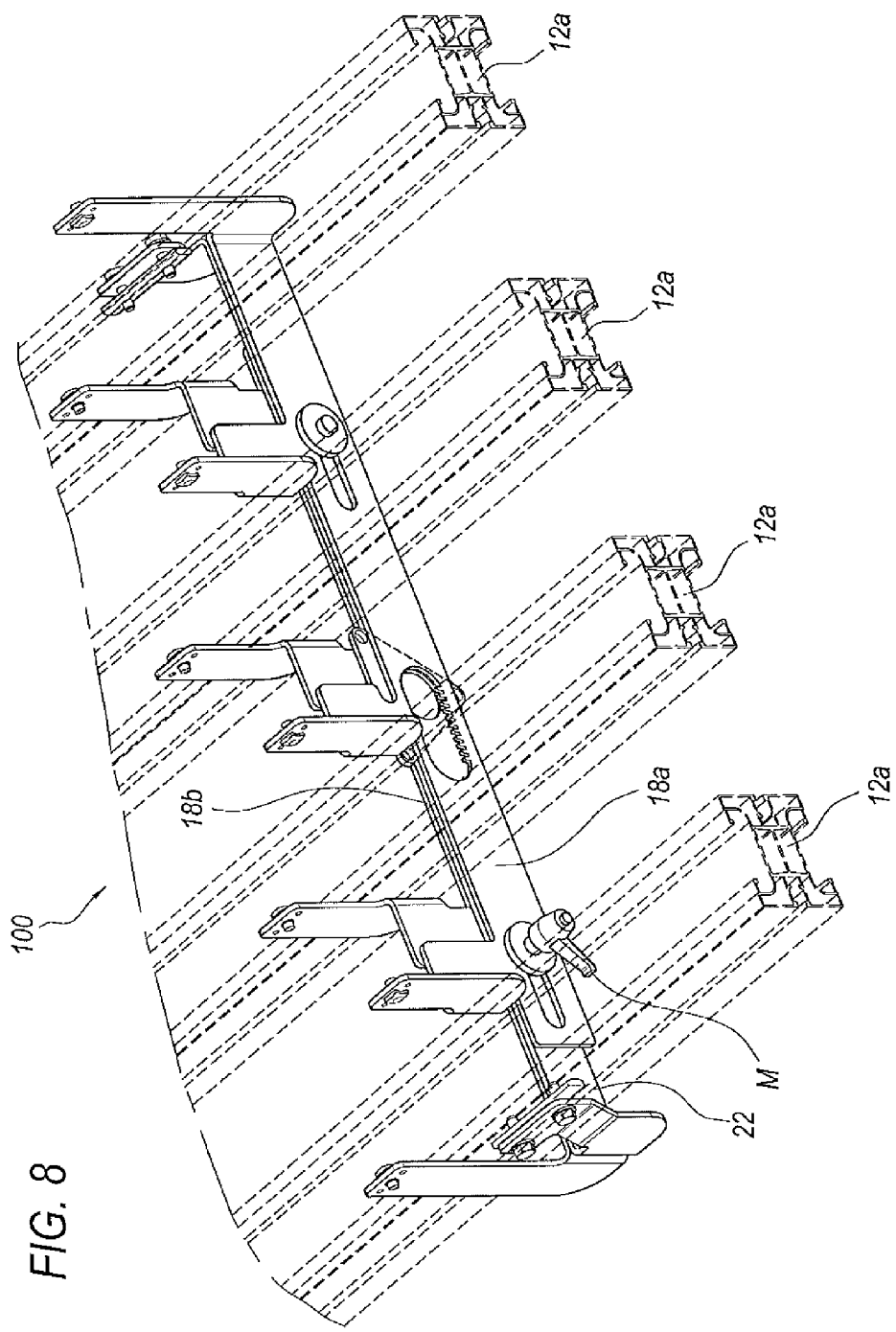
FIG. 8 is a perspective view of a second preferred embodiment of the conveyor, showing in particular the track adjustment means and of the longitudinal profiles supporting the conveyor belts.
Figure 9:
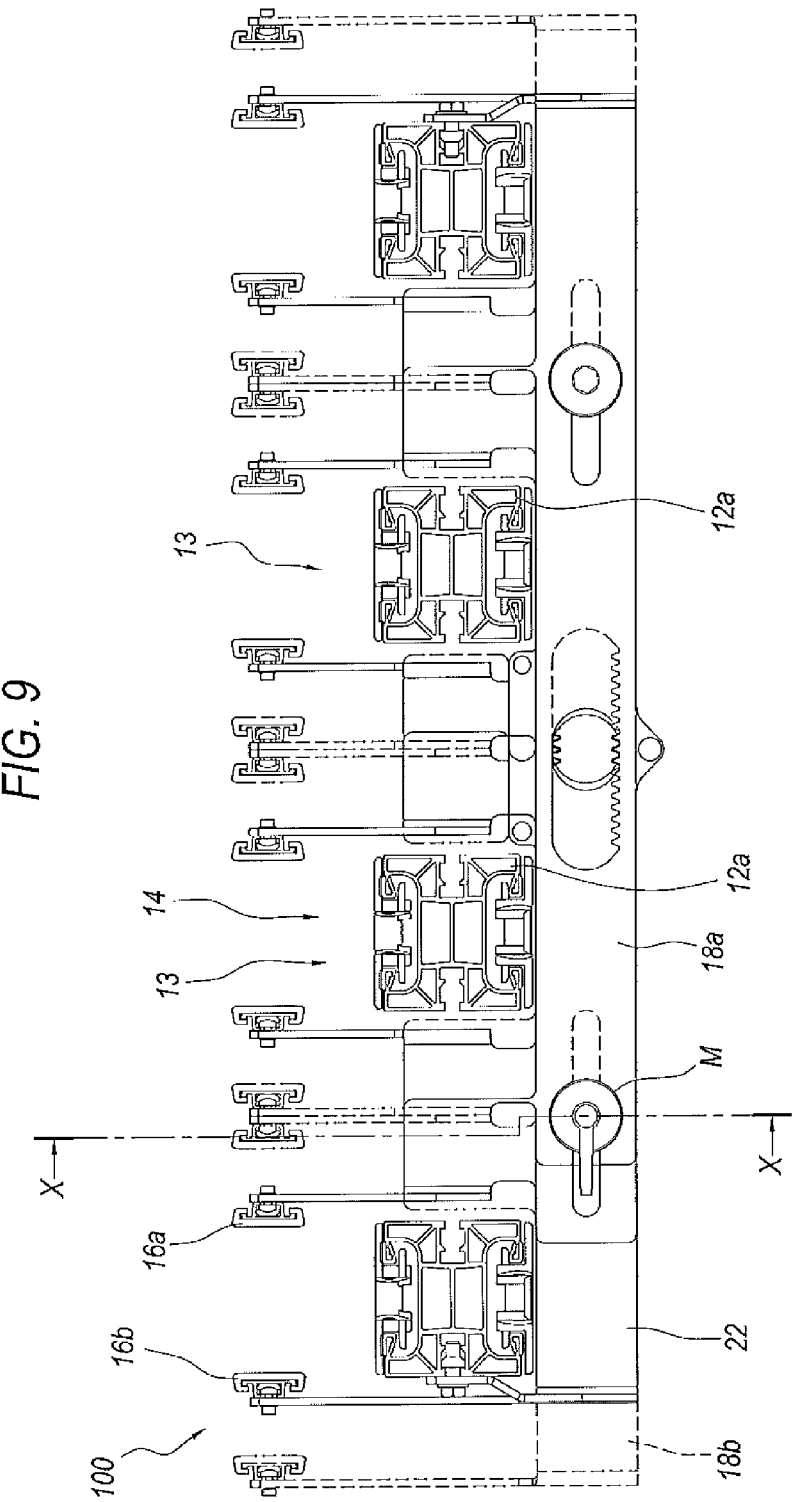
FIG. 9 is a transversal cross section of the second preferred embodiment of the conveyor according to the invention, showing only the supporting guide members and the respective supporting and fastening member.

Advantageously, as may be well inferred from FIG. 2, at a curved stretch of the lane or conveyor, there is an adjustment unit 18 for the lateral guides, at the upstream end of the selfsame curved stretch 142 of the conveyor.

Also, advantageously, at a curved stretch of the lane or conveyor, there is an adjustment unit 18 for the lateral guides 16*a*, 16*b*, at the downstream end of the selfsame curved stretch of the conveyor.

Also, advantageously, at a curved stretch of the lane or conveyor, an adjustment unit located at the upstream and/or downstream end of that curved stretch of the conveyor, is provided on a straight stretch 141 of the conveyor.

In practice, at a curved stretch of the conveyor, respective first and second adjustment means or units 18, 18 are provided at the upstream end and at the downstream end of that curved stretch of the conveyor, preferably on a straight stretch of the conveyor itself.

Further advantageously, as may be inferred from FIG. 2, one or more adjustment units are provided at a curved stretch of the conveyor, in an intermediate position of the curved stretch.

As illustrated, at an intermediate position of the curved stretch, there are adjustment units which are spaced at angular intervals from each other, and more specifically, equispaced from each other and from the adjustment means upstream and/or downstream of the curved stretch. The angular spacing between respective adjacent adjustment means or units at the curved stretch is preferably less than 45°.

With reference in particular to FIGS. 3B, 6A, 6B, 6C and 6D, according to a further advantageous aspect, each lateral guide 16*a*, 16*b* comprises, at a curved stretch of the respective lane, a respective elongate member 161' extending longitudinally on a curved stretch of the lane or conveyor, and a respective elongate member 161", extending longitudinally on a linear or straight stretch of the lane or conveyor, both of which have respective adjacent longitudinal ends 162' and 162" that can be moved relative to each other longitudinally or along the direction of extension of the lane or conveyor and have respective mutual coupling portions 163', 163" such as to define a lateral guide 16*a*, 16*b* that is continuous or substantially continuous along the direction of extension of the lane or conveyor.

Advantageously, each elongate member 161" of the straight stretch of the lane or conveyor has an end 162" which is longitudinally fixed and each elongate member 161' of the curved stretch of the lane or conveyor has an end 162' which is movable longitudinally or along the direction of extension of the lane or conveyor, to define as a whole a lateral guide 16*a*, 16*b* that is continuous or substantially continuous along the direction of extension of the lane or conveyor.

Advantageously, each lateral guide 16*a*, 16*b* is composed of a respective member 164, preferably of plastic, defining a perpendicular surface 16*c* for engaging the product, and a framework or supporting member 165, made of a metallic material, preferably aluminium, which is in turn fixed by screws 166 and to which the top end of the respective supporting member 186*a*, 186*b* is fitted by longitudinal sliding.

As illustrated, the screw 166 has a large head 166*a* designed to be inserted into a respective housing of the framework member and a shank 166*b* designed to be inserted into a transversal hole made at the top end of the supporting member 186*a*, 186*b*.

As illustrated, each product engagement member 164 is in the form of a generally C-shaped profile and has a perpendicular core 164*a* which defines the product engagement face or surface 16*c* and from whose perpendicular ends there extend end tabs 164*b*, 164*c*, extending transversely to and behind the core 164*a* and defining a corresponding hook for clasping the framework member 165.

The hooked tabs 164*b*, 164*c* are, in particular, adapted to clasp matching perpendicular tabs 165*b*, 165*b* of the framework member or profile which protrude perpendicularly to a main box-shaped or tubular body 165*a* with a generally quadrangular cross section defining a cavity for fitting on the supporting and sliding head 166*a*, in particular of the fastening screw 166.

Advantageously, the mutual coupling portions 163', 163" comprise, respectively, a longitudinally protruding portion 164' defining the perpendicular face 16*c* for the engagement and sliding of the product, and which transversely overlaps a narrow portion 164" defining a receiving cavity for the protruding portion 164'.

More specifically, the mutual coupling portions 163', 163" comprise an internal portion 164' which protrudes longitudinally from a respective engagement member 161' and which defines the perpendicular face 16*c* for the engagement and sliding of the product, and which transversely overlaps an external portion 164" defining a receiving cavity for the protruding portion 164' which extends longitudinally from the adjacent engagement element 161".

The mutual coupling portions 163', 163" comprise an internal portion 164' which protrudes longitudinally from the engagement member 161' at the curved stretch of the lane or conveyor and which defines the perpendicular face 16*c* for the engagement and sliding of the product, and which transversely overlaps an external portion 164" defining a receiving cavity for the protruding portion 164' which extends longitudinally from the adjacent engagement element 161" at the straight stretch of the lane or conveyor.

As illustrated, the overlapping portion is defined by a front transversal part 167*a* of the core 164 of the engagement profile 164 which extends longitudinally beyond the longitudinal end 162' of the corresponding longitudinal engagement member 161'.

The external coupling portion 163" is defined by a rear transversal part 167*b* of the core 164*a* of the engagement profile 164 which extends longitudinally beyond the longitudinal end 162" of the corresponding longitudinal engagement member 161".

In the straight stretch of the lane or conveyor, the framework member 165, supporting the corresponding lateral guide 16*a*, 16*b* is in the form of an elongate member 165 extending longitudinally along the direction of extension of the lane or conveyor.

As may be inferred from FIG. 6C, on the curved stretch of the lane or conveyor, the framework member 165 supporting the corresponding lateral guide 16*a*, 16*b* is in the form of a stubby member 165' supported by a corresponding perpendicular member 186*a*, 186*b* of the adjustment means 18.

The mutual coupling portions 163', 163", which are such as to define a lateral guide 16*a*, 16*b* that is continuous or substantially continuous along the direction of extension of the lane or conveyor, are located on the straight stretch 141 of the lane or conveyor just upstream of the curved stretch 142.

In practice, the lateral guides 16*a* e 16*b* comprise a plurality of plastic strips 164 extending along the conveyor path and mounted on aluminium strips, also extending longitudinally in the straight stretches, or on stubby segments 165' of them on the respective curved stretches.

Figure 12:
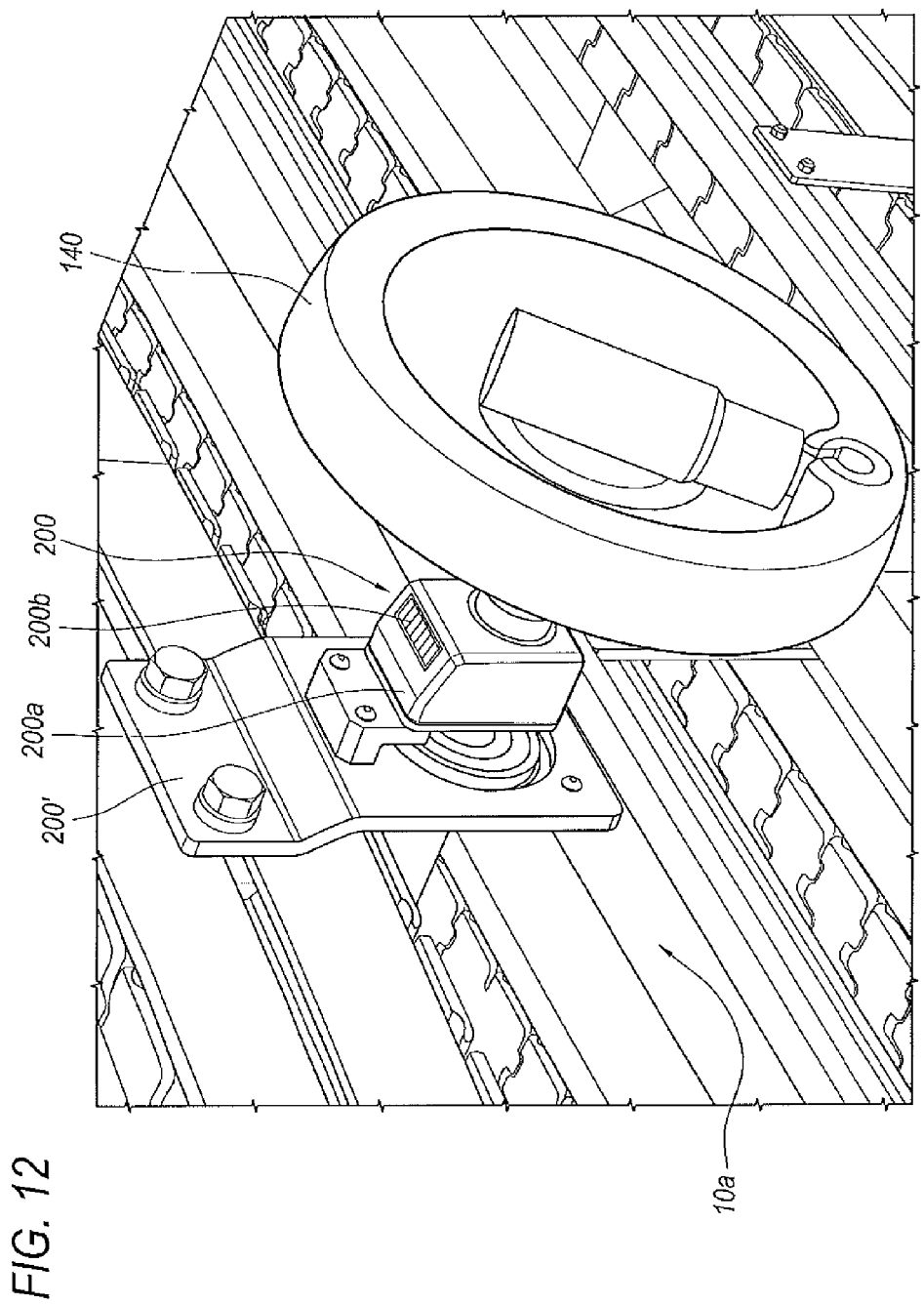
FIG. 12 is a perspective view of a detail of a further preferred embodiment of the conveyor, showing in particular the means for displaying the track width.
Figure 13:
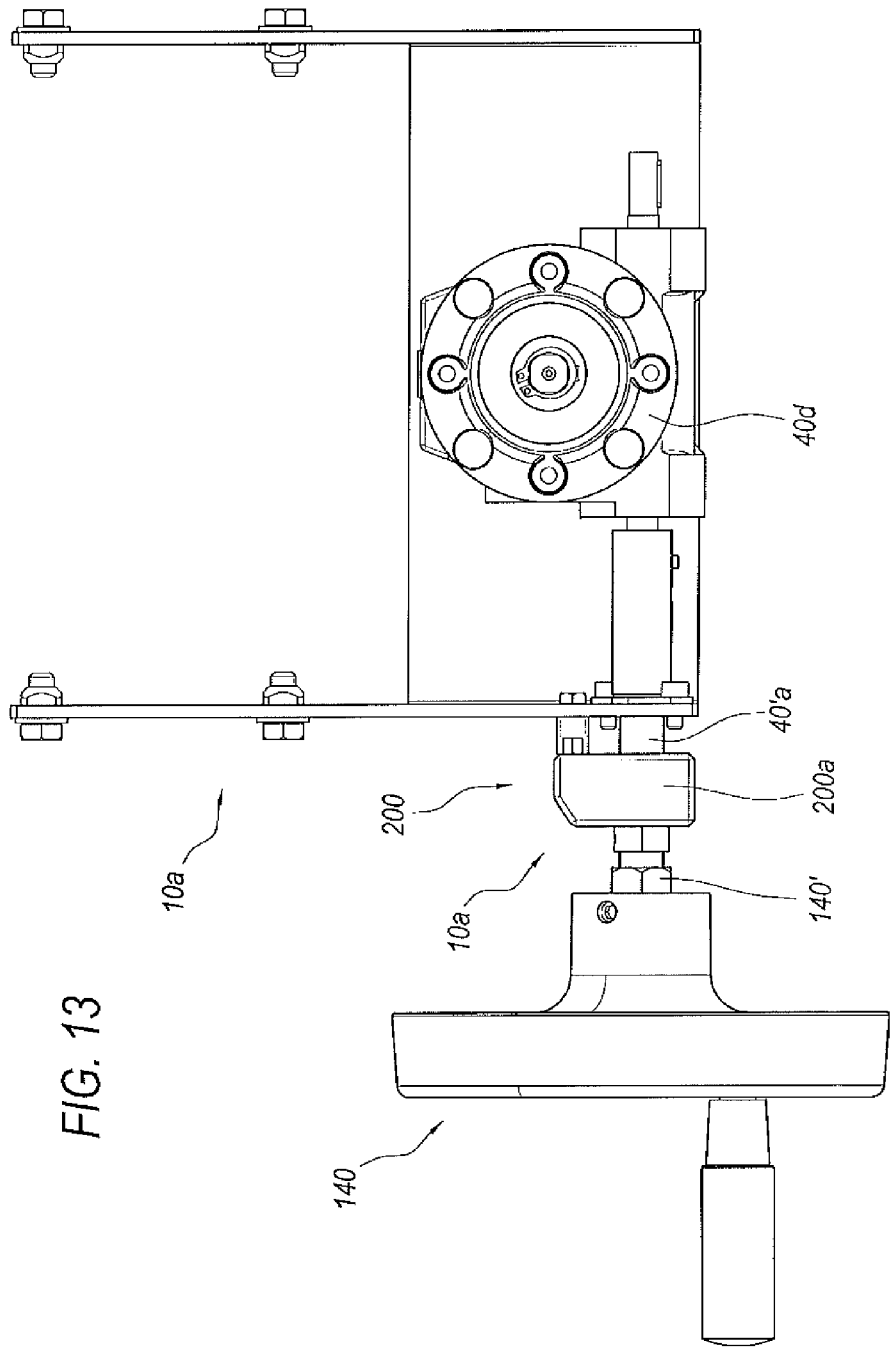
FIG. 13 is a side detail view of the track width display means, showing in particular their connection to the track width adjustment actuating means.
Figure 14:
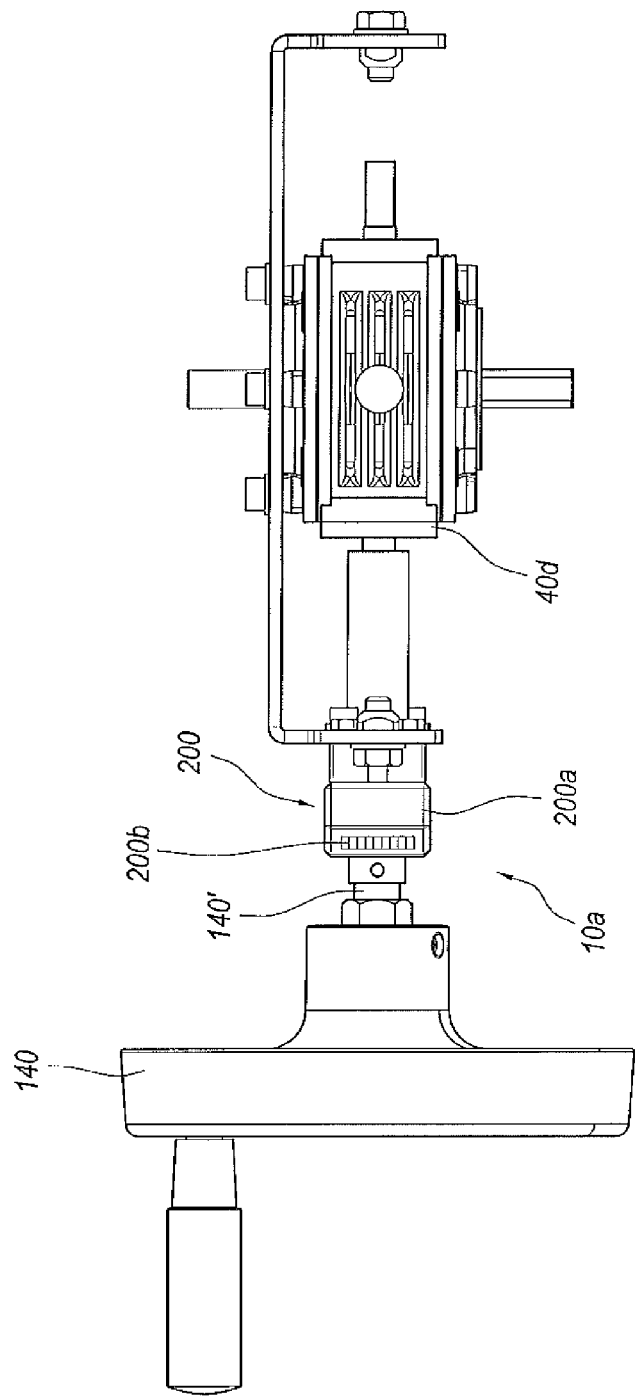
FIG. 14 is a top view of the track width display means, showing in particular their connection to the track width adjustment actuating means.

As may be inferred from FIGS. 12 to 14, in a further preferred embodiment of the conveyor, which has components that are identical or very similar to those of the first preferred embodiment, are denoted by the same reference numerals and are not described or commented on again in detail to avoid making this description too lengthy, the invention advantageously contemplates means 200 for displaying the width of the track, advantageously allowing the operator to quickly vary the width of the track and safely set at the desired position the lateral guides 16*a*, 16*b* defining the track.

Advantageously, the display means 200 are located at the flank 10*a* of the conveyor and, more specifically, protrude from the flank 10*a*, providing the operator with an easy view of the track width.

As illustrated, the display means 200 are driven by a control means or crank 140 for controlling track adjustment. More specifically, the display means 200 are interposed between the control means or crank 140 for controlling track adjustment and the flank 10*a* of the conveyor.

The box-shaped body 200*a* of the display 200 is connected to the flank 10*a* of the conveyor through a corresponding mounting bracket 200', which is illustrated only in FIG. 13.

As illustrated, the display means are in the form of a mechanical position indicator comprising a box-shaped body 200*a* having a display 200*b* showing the width of the track defined between the guides of the respective track or plurality of tracks connected to it, where input to the indicator is provided by way of the shaft 140' of the control means and output from the selfsame indicator is by way of the transmission means or shaft 40'*a*, extending transversely.

The invention described is susceptible of industrial application. It would be obvious to one skilled in the art that several changes and modifications can be made to the invention without departing from the spirit and scope of the invention, described in depth above. In particular, one skilled in the art could easily imagine further preferred embodiments of the invention comprising one or more of the features described herein. It will also be understood that all the details of the invention may be substituted by technically equivalent elements.

The invention claimed is:

1. A conveyor (10) for transporting products (11), the products being preferably in the form of rolls or packs of material for household or personal use, rolls of paper, toilet paper or kitchen paper, packs of facial or pocket tissues, paper napkins or the like, the conveyor comprising:
   a mounting frame (12) for one or more product feed lanes (13),
   each feed lane being defined by a respective conveyor belt (14), which extends along a respective path, and by a centering mechanism configured for centering the products on the conveyor belt (14),
   the feed lane further comprising respective first and second lateral guides (16*a*, 16*b*), the guides being spaced from each other transversely to the direction of the path of the conveyor belt in order to define a track having a respective width (d);
   the first and second lateral guides (16*a*, 16*b*) extending along the direction of the path of the belt or lane (13) and each lateral guide having a respective surface (16*c*, 16*d*) for laterally engaging the product (11);
   an adjustment element for adjusting the width (d) of the track, the adjustment element comprising a first transversal support and movement member (18*a*) for the corresponding first lateral guide (16*a*), and a second transversal support and movement member (18*b*) for the corresponding second lateral guide (16*b*);

an actuator (20) adapted to drive in opposite transversal directions the first and second transversal support and movement members (18a, 18b);

said actuator (20) comprising a toothed wheel (20a) having an axis directed along the direction of the path of the conveyor;

a transversal supporting and fastening member (22) configured for supporting the first and second transversal support and movement members (18a, 18b) and configured for fastening to the conveyor frame (12);

a supporting and sliding element configured so that the first and second transversal support and movement members (18a, 18b) move transversely relative to the transversal supporting and fastening member (22); and a mounting element configured for rotatably mounting the toothed wheel (20a) to the transversal supporting and fastening member (22).

2. The conveyor according to claim 1, wherein each of the first and second transversal support and movement members (18a, 18b), and/or a transversal supporting and fastening member (22), extends underneath the respective conveyor belt (14).

3. The conveyor according to claim 1, wherein the transversal supporting and fastening member (22) is interposed between the first and second transversal support and movement members (18a, 18b) for corresponding first and second lateral guides (16a, 16b), and each transversal support and movement member (18a, 18b) engages and runs on the respective transversal supporting and fastening member (22).

4. The conveyor according to claim 1, wherein each of the first and second transversal support and movement members (18a, 18b) and the transversal supporting and fastening member (22) are in the form of an elongate plate lying in a plane transversal to the direction of path of the conveyor.

5. The conveyor according to claim 1, further comprising, extending perpendicularly from each of the first and second transversal support and movement members, one or more rods (186a, 186b) configured for fastening a corresponding first and second lateral guide (16a, 16b), the rods being transversely spaced from each other and extending upwards next to the respective conveyor belt (14).

6. The conveyor according to claim 5, wherein the rods (186a, 186b) are made as one with the respective first and second transversal support and movement members (18a, 18b) and the rods (186a, 186b) are in the form of a strip that is bent at right angles to an elongate plate defining the respective first and second transversal support and movement member (18a, 18b).

7. The conveyor according to claim 1, further comprising, extending perpendicularly from the transversal supporting and fastening member (22), rods (22a, 22b) configured for fastening to the mounting frame, wherein the rods (22a, 22b) are made as one with the respective transversal supporting and fastening member (22) and are in the form of a strip that is bent at right angles to an elongate plate defining the respective supporting and transversal fastening member (22).

8. The conveyor according to claim 1, wherein the actuator comprises respective racks (208a, 208b) which mesh with the toothed wheel (20a) and which are provided on the first and second transversal support and movement members (18a, 18b).

9. The conveyor according to claim 8, wherein each rack (208a, 208b) is formed on a transversal stretch of an oblong lip of the respective first and second transversal support and movement member (18a, 18b), defining a hole into which the toothed wheel (20a) is inserted.

10. The conveyor according to claim 1, wherein the toothed wheel (20a) is housed in a matching hole (220a) in the transversal supporting and fastening member (22).

11. The conveyor according to claim 1, further comprising:

a mounting element configured for rotatably mounting the toothed wheel (20a) to the transversal supporting and fastening member (22); and opposite perpendicular locking gusset plates (20b, 20b), each having a respective hole (20'b, 20'b) for insertion of a rotary shaft (20c) protruding longitudinally from both sides of the mounting block, the toothed wheel (20a) being integral with the rotary shaft (20c) on which it is coaxially mounted.

12. The conveyor according to claim 1, wherein the supporting and sliding element further comprises a respective transversely oblong slot (118a, 118b) made in the respective first and second transversal support and movement member (18a, 18b).

13. The conveyor according to claim 12, wherein the supporting and sliding element comprises a longitudinal pin (118, 118) that is inserted into each of the respective transversely oblong slots and which slidably engages a respective elongate stretch or edge of a respective oblong lip, the pin (118) being inserted into a retaining hole (118') made in the transversal supporting and fastening member (22).

14. The conveyor according to claim 13, wherein the pin (118) is in the form of a hollow cylindrical body for insertion of the stem of a corresponding locking element (118c, 118d).

15. The conveyor according to claim 14, wherein the locking element (118c, 118d) is integral with a hand control (M) for locking or unlocking transversal movement of the respective first and second transversal support and movement member (18a, 18b) relative to the transversal supporting and fastening member (22).

16. The conveyor according to claim 1, wherein the adjustment element comprises a plurality of adjustment units distributed along the direction of path of the conveyor.

17. The conveyor according to claim 1, further comprising a control element (40) configured for controlling the adjustment element, the control element comprising a rotary control element (40a) and a transmission element and configured to provide rotational movement to the adjustment element, the rotary control element (40a) and the transmission element (20'a, 20c, 20d) being located underneath the conveyor.

18. The conveyor according to claim 17, wherein the transmission element comprises a plurality of shafts (40b), each shaft being connected to a respective rotary shaft (20c) of the actuator (20) through a respective cardan joint (42).

19. The conveyor according to claim 17, wherein the control element is located at a flank of the conveyor and, in particular, a first and a second control element (40a, 40a) is located at opposite flanks of the conveyor.

20. The conveyor according to claim 17, wherein the rotary control element (40a) (40a) is integral with a respective crank (140) for turning the control element or comprises meshing for a rotary power tool (240).

\* \* \* \* \*